Jan. 20, 1959 L. FRANCESCHINI 2,869,446
SHUTTER DEVICE FOR CAMERAS PROVIDED
WITH TWO OR MORE OBJECTIVES
Filed Feb. 24, 1955 4 Sheets-Sheet 1
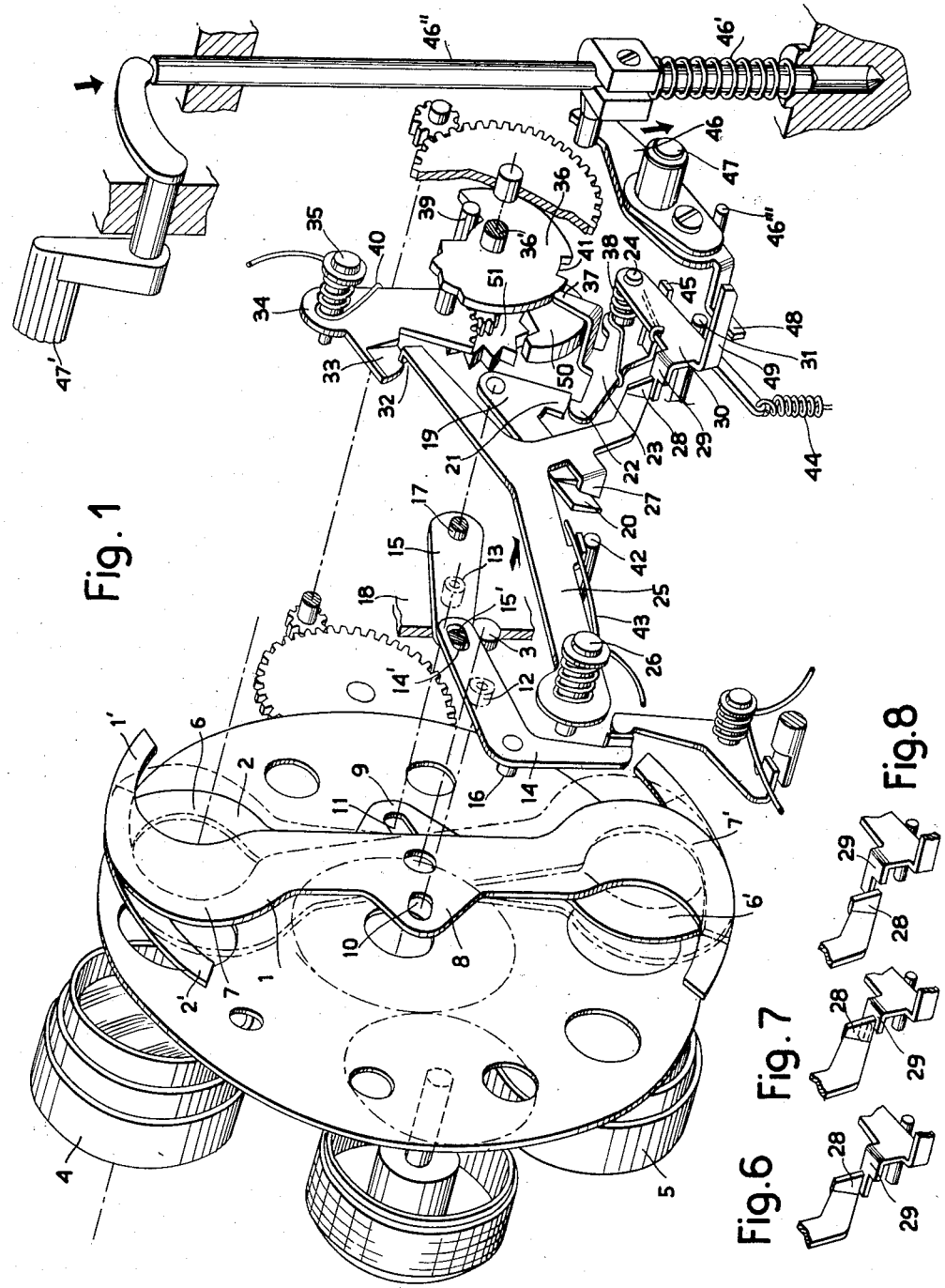
INVENTOR:
LORENZO FRANCESCHINI
by
Richardson, David and Nardon
ATTYS.

Jan. 20, 1959 L. FRANCESCHINI 2,869,446
SHUTTER DEVICE FOR CAMERAS PROVIDED
WITH TWO OR MORE OBJECTIVES
Filed Feb. 24, 1955 4 Sheets-Sheet 2

INVENTOR:
LORENZO FRANCESCHINI
By
Richardson, David and Nardon
ATTYS.

Jan. 20, 1959  L. FRANCESCHINI  2,869,446
SHUTTER DEVICE FOR CAMERAS PROVIDED
WITH TWO OR MORE OBJECTIVES
Filed Feb. 24, 1955  4 Sheets-Sheet 3

INVENTOR:
LORENZO FRANCESCHINI
BY
Richardson, David and Nardon
ATTY'S.

Jan. 20, 1959

L. FRANCESCHINI 2,869,446

SHUTTER DEVICE FOR CAMERAS PROVIDED WITH TWO OR MORE OBJECTIVES

Filed Feb. 24, 1955

INVENTOR:
LORENZO FRANCESCHINI
By
Richardson, David and Nardon
Atty's.

United States Patent Office 2,869,446
Patented Jan. 20, 1959

2,869,446

SHUTTER DEVICE FOR CAMERAS PROVIDED WITH TWO OR MORE OBJECTIVES

Lorenzo Franceschini, Firenze, Italy, assignor to Officine Galileo Societa per Azioni, Firenze, Italy, an Italian corporation Application February 24, 1955, Serial No. 490,292

Claims priority, application Italy August 19, 1954

6 Claims. (Cl. 95—62)

The invention relates to a blade shutter device for cameras provided with two or more objectives, said shutter being provided with a single system of two blades dependent upon a single apparatus of drive (motor), delay and release.

It is known how the problem of the shutter, for example in the fine stereoscopic cameras, is generally solved by the use of two separate shutters, each shutter being complete of the blades unit, the drive unit and the control members and having in common a connection device adjusted for the synchronization. In some cases, there may also be provided some simplifications relating to the connection of the mechanisms of the drive, delay and release, but the shutter mechanisms (sets of blades) tend to remain separate of one another. This consideration may also be extended from the simplest case of the stereoscopic camera provided with a pair of objectives to more complicated cameras designed for special uses, provided with more objectives.

It is apparent that in any case, for the perfect operation of a camera provided with several objectives, the manufacture of the shutters, forming a part of an assembly, should be very accurate, both with reference to the manufacture of the components forming said shutters and with reference to the setup of the various mechanical units; in fact, these shutters are required to have a simultaneousness of operation at similar shutting characteristics. The manufacture of similar units, which are provided with the required accuracy for the actuation of the abovementioned characteristics thus is not very cheap, particularly if the shutter, in the abovementioned conditions, is provided with more than two objectives.

The object of the invention is to provide a shutter device for cameras, which may be a double one in the simplest case (suitable for stereoscopic cameras) or multiple for special applications; said shutter will always include a single shutting device, substantially composed by a system of two blades, and a single delay device; said two blades, which through their relative displacements may set up multiple shuttings or closures (two in the simplest case), rotate on a single pin preferably situated equidistant from the openings to be shut; a single drive device supplies thereto equal angular displacements in the opposite direction during its unwinding. Means are provided to be associated with said drive so that these motions of the two blades are appropriately delayed around the point of the maximum aperture, both owing to a single mechanical speed governor (delaying unit) operating with the ambit of restricted times, and owing to the direct action and the single control effected by the aperture (half exposure); by means of these arrangements the mechanism will assume, in its assembly, the requested characteristics of functional isochronism and of a perfect equalness in the shutting operation. It is to be noted that one of the main advantages of this shutter, in its arrangements according to the invention, is that: mechanical members, made with a poor accuracy, are used for the winding of the drive spring, for the release of the member from the control lever, for the engagement of the two blades to the drive unit, for the engagement of the delay device and finally for the disengagement of the latter from the kinematic assembly of the blades (all said operations are successively effected in the time according to the abovementioned prearranged sequence), no adjustments are provided for the assembly of said elements, and this is both absolutely and relatively.

This invention will be better appreciated by an example of a double effect shutter suited for a stereoscopic camera, like the simplest case of a multiple effect shutter, besides extensions of said embodiment. These examples will be hereinafter described and illustrated by appropriate drawings, wherein:

Fig. 1 diagrammatically shows a perspective view of the shutter for a pair of objectives, with the members separated;

Fig. 2 diagrammatically shows the same shutter shown on the side of the camera (the blades are in the "closed" position in the drawing);

Fig. 3 also diagrammatically shows the single set of the blades in the "opened" position;

Figs. 6, 7 and 8 show a perspective view of a detail of the kinematic connection of the mechanism in different positions.

Figure 3:
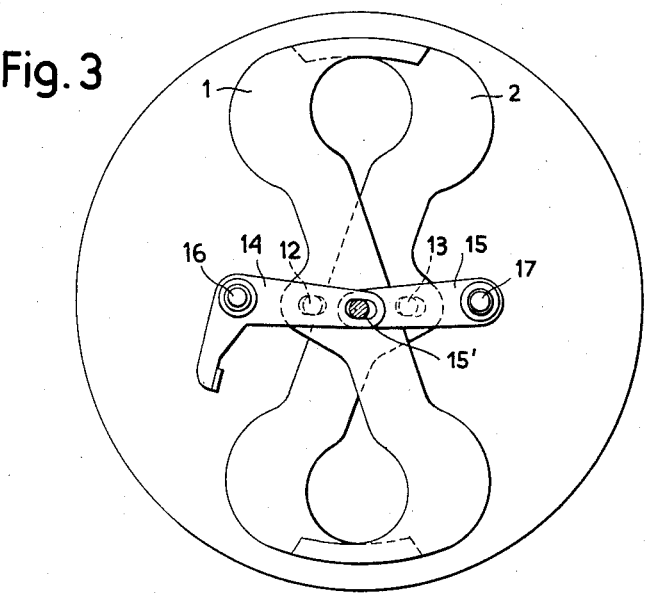
Figure 2:
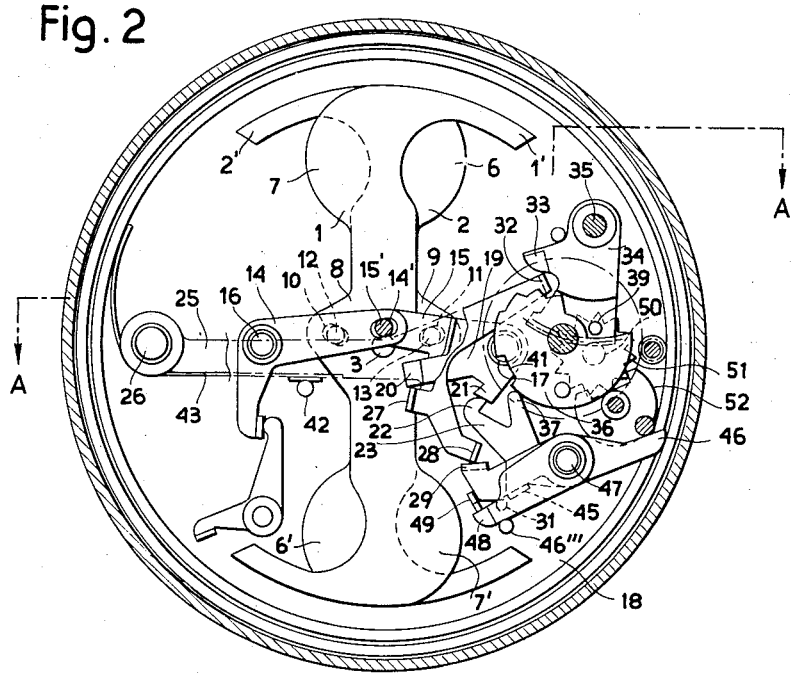
Figure 4:
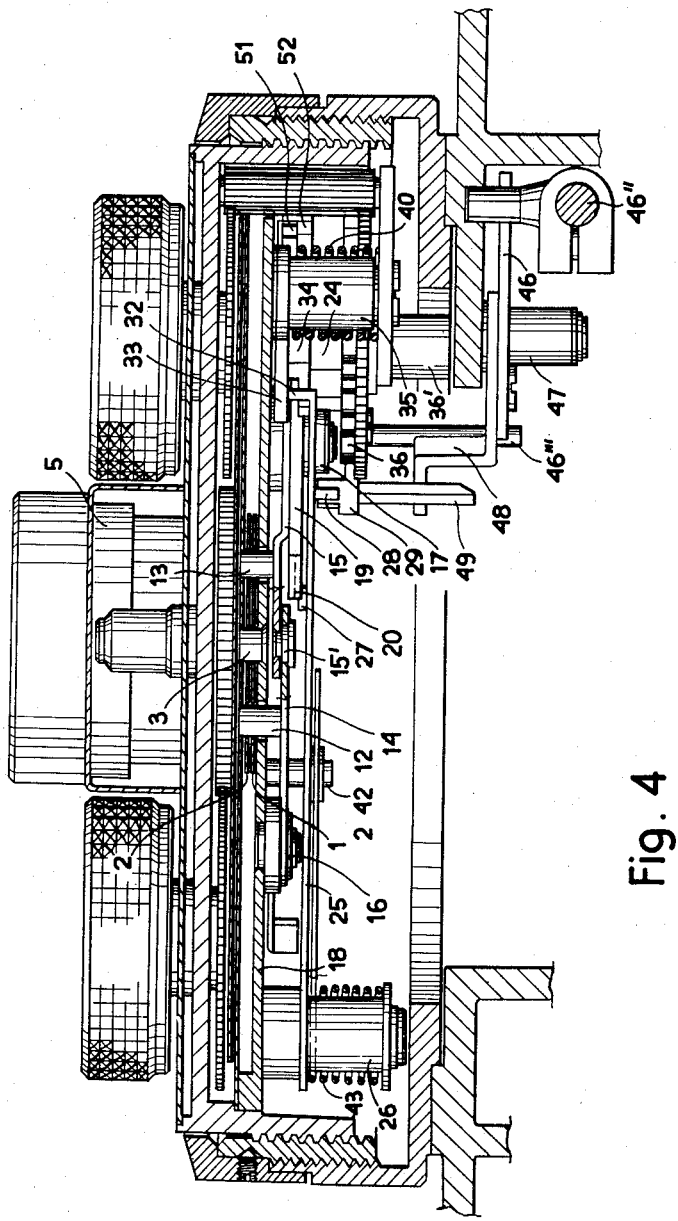
Fig. 4 shows a cross-section of the same shutter taken along the line A—A of Fig. 2.

The shutter, object of the invention, is essentially formed by two blades or leaves 1 and 2, hinged at 3 in a symmetrical position with respect to the two objectives 4 and 5, the ends 6—6' and 7—7' of each of said blades respectively are preferably formed like a scythe, but may have any other suitable shape, however always in such a way that when said blades are closed, they simultaneously and completely intercept the two apertures of the camera, which are formed in correspondence of the objectives 4 and 5 respectively.

Said blades 1 and 2 are each provided laterally with lugs 8 and 9—located at the height of their hinge—said lugs being provided with tracks or slots 10 and 11, and said tracks containing the pins 12—13 (the pins are visibly detached from the track in the drawing for major clarification), joined to two members or arms 14 and 15 respectively, the first being hinged at 16 and the second at 17 to the stationary portion 18 which forms the bearing of the mechanism; said portion being broken away in Fig. 1 in order to avoid a complicated illustration.

One of said arms 15 is provided with a post 15' at its end, designed in such a way as to enter into a track or slot 14' made at the end of the arm 14, the whole is arranged and proportioned in such a way whereby the rotation of one of said arms around its own pin determines an equal angular displacement of the other one.

Said arm 15 is connected to a fork 19 provided with two V-shaped arms, one of which has a sloped profile 20, while the other arm forms a lug or stop 21 designed to engage a tooth 22, carried by a detent arm 23, which is capable of rotating, at its base, on the pin 24. The arm 25, hinged at 26 to the bearing 18, is arranged in a plane immediately set side by side to the plane wherein the fork 19 rotates; said arm 25, owing to its thickness and nature of material, is made in such a way to be preferably flexible in the zone near the pin 26.

The arm 25 is provided with three lugs, of which: the lug 27, bent towards the plane wherein the fork 19 lies, overhangs the prismatic end 20, belonging to one of the arms of the same fork 19, with its own inclined edge; the lug 28, also bent but in the opposite direction of the lug 27, overhangs the plane of a small square or plateau 29 with the edge of the bent portion (the particular shape of said square will be hereinafter specified), said square 29 being carried by an arm 30 pivotable on the shaft 24 (therefore coaxial with said arm 23, but independently upon the latter) and restricted in its displacement by the pin 31 connected to the stationary portion 18; the third lug 32, square bent on the same side as the lug 27, is finally situated near a stop 33, which is integral with a sector 34 hinged at 35 to the stationary bearing 18.

The following members will rest on the profile of a cam 36, which will be hereinafter described: the end of a lug 37 integral with the arm 23, owing to a spring 38 re-acting between 30 and 23; a pin 39, connected to the sector 34, owing to a spring 40 re-acting between 34 and 18. The whole is arranged in such a way that, while on one side the tooth 22 integral with the arm 23 can or cannot engage the stop 21 carried by the fork 19, according to the fact that said lug 37 can or cannot meet a recess 41 provided in the cam 36, the sector 34 will have its angular displacements restricted on one side by the magnitude of the radius of the cam, measured at the point of contact of its profile with the same pin 39.

As far as the static arrangement of the described mechanical assembly is concerned, the rest position of the two arms 14—15 is determined by a stationary stop, against which one of the arms is pressed by a suitable relatively weak spring; the blades 1 and 2 will be superimposed owing to this position of 15, to which there is a corresponding symmetrically defined position of 14 (owing to the kinematic link 14'—15'), and therefore the two apertures, in correspondence of the objectives 4 and 5, will be in the "closed" position.

As far as the lever arm 25 is concerned, it is kept adherent by the spring 43 to the stop 42, connected to the stationary bearing 18; the lugs 27 and 32 have their lower edges spaced from the upper edges of the profiled arm 20 and stop 33, respectively, while the lug 28 is located in the immediate proximity of the upper plane of the small square 29, integral to the arm 30.

This arm 30, in its turn, is kept in contact with the stationary stop 31 by the spring 44, while the arm 23 is retained in a predetermined position in relation to the arm 30, through a lug 45 integral to the latter and square bent thereto, owing to the spring 38, an end of said spring, as already mentioned, being hooked to the arm 30.

The performance of the device, when in motion, is the following: a lever 46 hinged in 47, controllable on the outside of the shutter by means of a pushbutton 47' and a stem 46", is moved in the direction of the arrow, overcoming the action of a spring 46', which stresses the stem 46"; the end 48 of said lever 46 acts on a pin 49, integral with the arm 30, so as to detach the latter from the support 31 overcoming the reaction of the spring 44; the plane of the square 29 will thus press the tooth 28; the arm 25, being consequently detached from the stationary support 42 and overcoming the reaction of the spring 43, will begin to rotate on the pin 26 counter-clockwise as viewed in Fig. 1.

The bent lug 27 of the arm 25, during this rotation, will be compelled to follow, with its inclined edge, the inclined plane of the prismatic end 20 of the arm of the fork 19; however while the latter is shaped in such a way as not to practically undergo a remarkable deformation, the arm 25 will bend towards the observer (in the direction indicated by the arrow). As the rotation of the lever 46 and therefore of 30 is carried on, the lower flat edge of 27 will arrive at a certain moment at the height of the upper flat edge of the prism 20; the resilient deformation of 25, occurred, as already mentioned, owing to the inclined plane of 20, will cause the arm 25 to suddenly return into its plane, when the support of 20 is released, while the lower edge of 27 and the upper one of 20 will be mutually in contact. But as soon as the rotations of 30 and of 25 begin, and owing to the latter, the lug 28 of 25, which is pushed towards the top by the flat portion of the square 29, will begin to slide on the latter, being gradually displaced at the same time towards the bent portion of the square 29, and that is, towards the observer, by effect of the flexion of 25, which, as already mentioned, is stressed in this direction by the influence of the inclined plane of 20 on 27.

On the other hand, the surface of said square 29, while in a first moment, offers a support along the entire length of its contacting line, to the lower edge under the bent portion 28, in a second moment, that is, when the lower edge of 27 will begin to approach the upper edge of 20, owing to the particular contour of said surface of 29 which is cut like a step providing a recess (see particularly Fig. 6), this support will be abruptly reduced (see Fig. 7) to a small portion of the same edge of 28. This reduction has such an extent as to take account of the displacement of 28 towards the bent portion of the square 29, so that as soon as the lower edge of 27 will have passed over the upper edge of 20, and the arm 25 will immediately regain its position in its plane, the end of 28 will leave the reduced support of the plane of 29 and drop through the recess (see Fig. 8), while 25, disengaged from 30 and therefore from 46, will then be free to rotate clockwise as viewed in Fig. 1, owing to the spring 43 which has attained its maximum winding in that moment.

During its rotation the arm 25 will drag the prismatic end 20 of the fork 19 which, as already abovementioned, is now in contact with 27 and this will last until, by effect of the same rotation of the two elements 25 and 19, the lower edge of 27, after having slid along the upper edge of the prism 20, will leave the contact, therefore allowing the presently free fork 19 and the arms 14 and 15 connected thereto, to return into their initial position by effect of their spring, which is weaker than the spring 43 and which had been wound by the latter during the first stage of the motion.

A rotation of the blades 1 and 2 is caused in an opposite direction around the central pin 3, by the motion of the two arms 14—15, through the pins 12—13 integral thereto and which are introduced into the tracks 10 and 11 respectively of the two blades 1 and 2 firstly (rotation of 25 together with 19), the two apertures being opened in correspondence of the two objective systems 4 and 5, and secondly (after the disengagement of 27 from 20), effecting the closure.

The rotation of the arm 25 in a counter-clockwise direction in the first stage of its motion, as far as the point that is wherein 28 leaves 29, will lead its square bent lug 32 to neatly pass the tooth 33, which is integral to the sector 34, without however touching it because, as already mentioned the same lever 25 will bend, owing to the lug 27, which slides on the inclined plane of the prismatic end 20; when 28 leaves 29 and the arm 25 begins the rotation in the opposite direction, after a suitable idle run, 32 will strike against the edge of the tooth 33 and will drag therewith the sector 34, which said tooth is integral with, overcoming the reaction of the spring 40. The sector 34 is toothed and meshes with a pinion connected to the gearwheel 51 of an escapement system which also includes a well known rocker 50, however designed to delay or hold the angular movements of the sector 34. As already mentioned, the pin 39, connected to the sector 34, rests on the profile of the cam 36, the whole being arranged and proportioned in such a way whereby if in the point of contact with the edge of the cam the radius of the cam will be small the tooth 33 will be in a relatively high position with respect to 31, whereby its dragging length by 32 will be long; if the radius of the cam will be large, the opposite will occur. Therefore there will be a delay in the return stage of the lever 25, said delay being inversely proportional to the radius of the cam 36; this delaying or holding action will last until the lug 32, owing to the rotation of the sector 34, will leave the edge of 33.

The rotation of 30, by effect of 46, besides moving the arm 25 with the above described consequences, will free 45 and therefore the arm 23 which then may be affected by the spring 38; this influence will be neutralized if the edge of the lug 37, integral with said arm 23, will find the profile of the cam 36 raised in the point wherein the contact takes place; then the stop 21, which is integral to the fork 19, will pass again without any effect up to the height of the tooth 22; if, instead, the same lug 37 will find the depression 41 in the profile of the cam 36, then the tooth 22 will hook the stop 21, thus locking the fork 19 in a lowered position and then therewith, through 14 and 15, holding the blades 1 and 2 in the "open" position; this position will then be preserved for all the time in which the operator will keep the arm 30 raised by means of the lever 46, but when the latter, rendered free, will return to rest on the stop 31 owing to the spring 44 (whose action has a greater force than that of the spring 38) will strike on the pin 45 integral with the arm 23 with the result of pulling the tooth 22 back, which had engaged the stop 21 integral with the fork 19; all the system 19—14—15, by effect of the spring related to the arms 14—15, will then return into the initial position and therefore the blades 1 and 2 will reclose the two apertures.

According to what has been stated in the beginning and what has resulted from the description, the sequence of the operations effected after the rotation of the lever 46, owing to particular solution adopted according to the invention, may be actuated with mechanical members of a relatively simple make and which do not require a special care for their assembly, this being compatible with a positive efficient operation of the unit. For example, the provided flexure of the arm 25 allows an absence of adjustments or controls of the mechanical relation among the elements 20—27 and 28—29, whereby the disengagement of the two latter (28 from 29) is subordinated to the engagement between the two former (20—27); the operation of the delay system, which is introduced in the most appropriate opening time and always according to the extent dependent upon the position of the cam 36, still depends upon the same flexure of 25; the particular and simple arrangement of the arms 14 and 15 and the like is finally efficient for its simultaneous symmetrical effect on the motion of the blades.

Figure 5A:
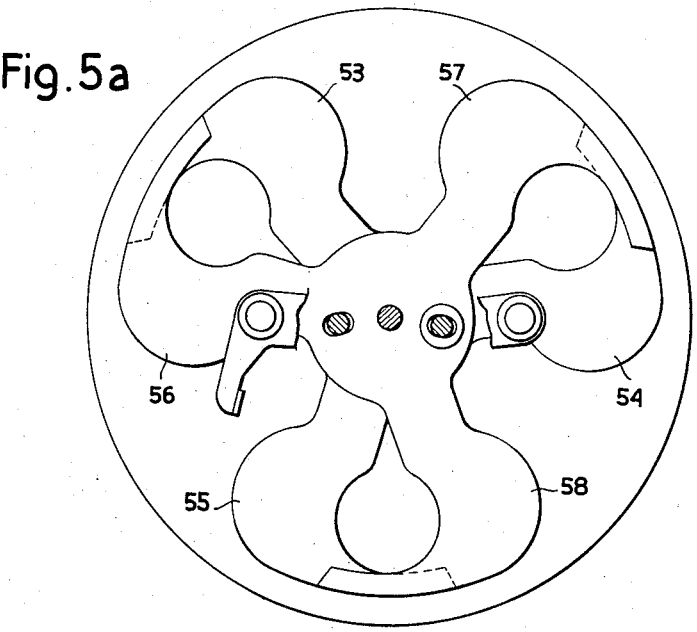
Figs. 5 and 5a show the unit of the two blades for a triple effect shutter in the closed and open positions.
Figure 5:
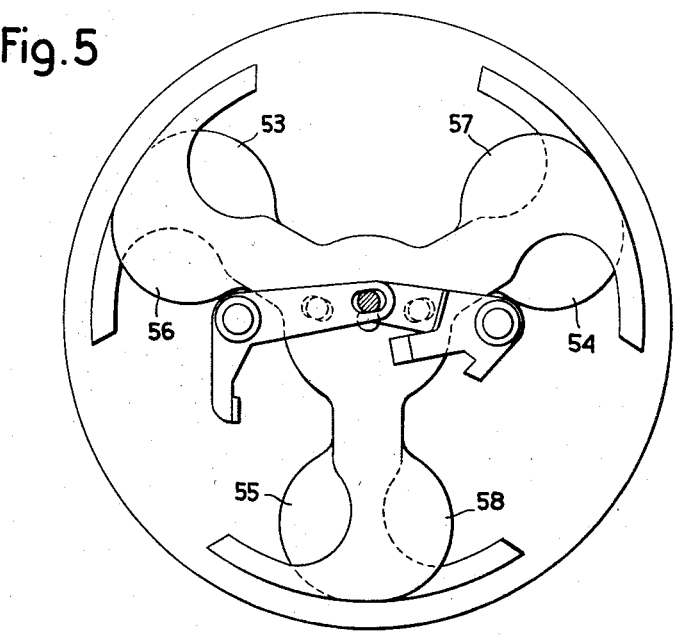

The above described example relates to the case of a double effect shutter apt for stereoscopic cameras; but this, as already stated, has been mentioned as the simplest actuation. In practice, there are some cases whereby in a camera it is necessary to recur to the simultaneous action of more than two objectives for special scopes. The modification of Figs. 5 and 5a shows, as an embodiment, the interception members (set of the two blades) belonging to a triple effect shutter. In this type of shutter, the entire mechanism remains the same as the one already described and illustrated; the blades are two with the difference that each blade, instead of having two lobes 6—6' and 7—7' arranged at 180°, is provided with three lobes (53—54—55) (56—57—58) arranged at a 120° displacement; however the shape of these lobes is always similar to that already described, and also the specific operation of the set of the blades is the same. It is apparent that it is possible to obtain, with a higher number of lobes and with the same mechanical members, a multiple shutter having the same characteristics of the described one.

Another actuation according to the invention, which may be suitable for a multiple effect shutter, is that wherein the blades provided with two or more lobes, each having the shape of a scythe as in the embodiment, or having any suitable shape, may be replaced by two discs carrying the same number of appropriate aperture holes and located in the same arrangement so that said two discs, operated in opposite directions by a mechanism similar to the described one, may simultaneously intercept the requested number of the objectives with the same characteristics.

Other actuations may be assumed by the device, of which an embodiment has been described and all this without however departing from the conceptual ambit of the invention.

What I claim is:

1. A camera device having at least two objectives, a stationary bearing, a single shutter device mounted on said bearing for said objectives, a pin projecting from said bearing, said shutter device including a pair of leaves pivotally mounted on the pin for movement toward and away from each other for closing and opening said objectives, respectively, said leaves being normally in closed position and having elongated slots, mechanism for controlling the movement of said shutter leaves including a pair of leaf-actuating members pivotally mounted on the bearing closely spaced from the shutter leaves, pins carried by the leaf-actuating members interlocked with the slots in the leaves, said members having overlapping ends, the end of one of said actuating members having an elongated slot, a post on the end of the other actuating member extending into said latter elongated slot whereby upon movement of said one actuating member the pin on said one actuating member pivots its leaf in one direction while the other actuating member, its pin and other leaf are simultaneously moved in the opposite direction, a pivoted forked member connected to one of said leaf actuating members, said forked member having a sloped profiled end, an elongated resilient arm member pivotally mounted on the bearing at one end, being disposed parallel to said forked member and being closely spaced therefrom, said arm member having a first projection extending radially in one direction in normal contact with the sloped end of the forked member, a second projection on the arm member extending radially in the opposite direction, a spring on the bearing urging said arm member around its pivot in one direction, manually actuated means for opening said shutter leaves including a pivoted arm having a bearing surface normally in contact with said second projection on the arm member whereby the arm member is moved in an opposite direction carrying the first projection thereon over the surface of the sloped end of the forked member thereby deflecting said arm member out of its original plane and thereby moving said first projection over said sloped end and into interlocking engagement therewith, means for breaking the connection between said second projection and said pivoted arm, said spring moving said pivoted arm member, interlocked pivoted forked member, associated leaf-actuating members and shutter leaves to shutter opening position upon the breaking of said connection, means for holding said arm member and forked member in shutter opening position including a pivoted abutment on the bearing and a connection between said abutment and the pivoted lever, means for breaking said latter connection, and means for retracting the parts to shutter closing position upon the breaking of the latter connection.

2. A device as defined in claim 1, wherein said abutment constitutes a sector, an end projection on the arm member disposed close to said sector, means acting on said sector for controlling the rate of rotation thereof in one direction, a tooth provided on said sector and cooperating with the end projection of the arm member during return movement of said arm member, a control shaft supported by said bearing, a cam on said shaft, a pin connected to said sector and operatively engaging said cam to limit angular movement thereof in one direction, and a spring acting on said sector to urge said pin into contact with said cam.

3. A device as defined in claim 2, including a further pivot pin provided on said bearing, a lug on the other end of the forked member, a detent arm pivoted on said further pivot pin, said detent arm provided with a tooth cooperating with said lug of said forked member to retain said forked member in the opening position of said shutter leaves, said detent arm being further provided with a lug, and means resiliently acting upon said detent arm so that the lug of said detent arm contacts the periphery of said cam, said cam being provided with a recess for receiving said lug at an appropriate angular position of said cam.

4. A device as defined in claim 3, wherein a spring is connected at one end to said detent arm and at the other end to said pivoted lever, said detent arm being provided with a detent projection which is urged by said latter spring into contact with said pivoted lever, whereby upon rotation of said pivoted lever said detent arm is freed so that upon receipt of said lug of said detent arm in said recess of said cam, said tooth of said detent arm can act upon said lug of said forked member.

5. A device as defined in claim 4, characterized by a support for said pivoted lever, a spring urging said pivoted lever to rest on said support, whereby upon pivoting of said pivoted lever said arm is also pivoted initially because of the contact between the contacting surface of said pivoted lever and said second projection, further pivoting of said arm resulting in return of said arm to its initial plane whereupon said second projection becomes disengaged from said pivoted lever through registry with the recess in said pivoted lever.

6. A device as defined in claim 5, including a lever pivotally mounted on said bearing and operatively connected with said pivoted lever, and driving means operatively connected with the lever pivoted on the bearing, said means extending externally of said camera device.

References Cited in the file of this patent

UNITED STATES PATENTS 363,547    Schneider _____ May 24, 1887